May 12, 1936.  L. L. SCOTT  2,040,342
AUTOMATIC VALVE
Original Filed March 21, 1930
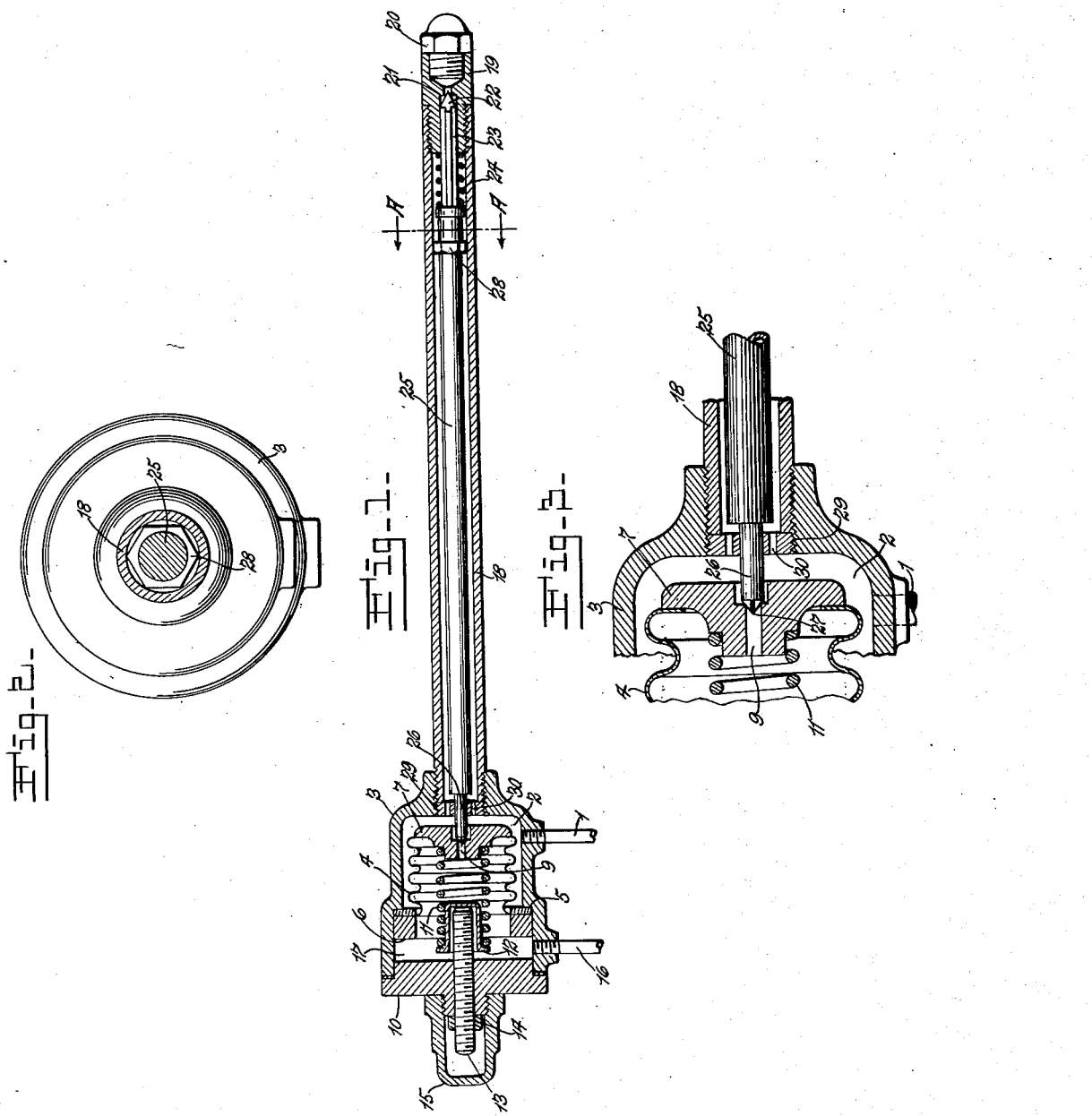
Inventor
Lewis L. Scott
by Rippey & Kingsland
His Attorneys Patented May 12, 1936

2,040,342

UNITED STATES PATENT OFFICE 2,040,342

AUTOMATIC VALVE

Lewis L. Scott, St. Louis, Mo.

Original application March 21, 1930, Serial No. 437,783. Divided and this application September 24, 1932, Serial No. 634,641

3 Claims. (Cl. 137—153)

This invention relates to automatic valves for controlling the flow and pressure of liquids, such as oil and the like.

The object of my invention is to provide a simple and effective automatic valve and one that can be produced at low cost.

This application is a division of my application Serial No. 437,783, filed March 21, 1930.

In the accompanying drawing—

Fig. 1 is a sectional view of my automatic valve.

Fig. 2 is an enlarged end view, shown partly in section on the line A—A of Fig. 1.

Fig. 3 is an enlarged sectional view of the bypass valve, shown in Fig. 1.

Referring now to the drawing, the numeral 1 indicates an oil intake pipe from the pressure side of a pump, not shown, which pipe is connected to the interior chamber 2 of the casting 3. The numeral 4 indicates a flexible bellows, one end of which is seated against the shoulder 5 of the casting 3, which end is locked in position against the shoulder 5 by the nut 6. The other end of the flexible bellows 4 is secured to the member 7, which member is formed with a valve seat 8 and a fuel return passage 9. The numeral 10 indicates a head which is secured to the casting 3. The numeral 11 indicates a spring, one end of which bears against the member 7 and the other end bears against the member 12, which member 12 is adjustably carried by the screw 13, so that, by regulating the screw 13, the pressure on the spring 11 can be varied so as to adjust the liquid pressure in the chamber 2. The numeral 14 indicates a lock nut for locking the screw 13. The numeral 15 is a cap secured to the head 10 and which covers the screw 13. The numeral 16 indicates a by-pass fuel return pipe, which may be connected with a tank, not shown, for the purpose of returning the fuel from the chamber 17. The numeral 18 indicates a hollow pipe secured to the casting 3 and carries at one end a member 19, to which member 19 is secured a spray nozzle 20, of any well known form. The member 19 is provided with a valve seat 21 for the valve 22. The valve 22 is provided with grooves 23 for the passage of oil. The numeral 24 indicates a spring interposed between a head formed on the valve 22 and the member 19, the purpose of which will be later described. The numeral 25 indicates a rod which contacts with the head of the valve 22 and which carries the by-pass valve 26. The numeral 27 indicates a groove cut in the by-pass valve 26 (Fig. 3), the purpose of which will be later described. The rod 25 is guided in the tube 18 at one end by the hexagon member 28, and at the other end by the threaded member 29 (Fig. 3), which member 29 is provided with the holes 30 to permit the passage of fuel into the tube 18.

Where this valve is used in connection with an automatic oil burner, fuel is pumped into the pipe 1 and enters the chamber 2, and then passes through the holes 30 into the interior of the pipe 18. The member 7 will move to the left under pressure of the fuel, and the valve 22 and rod 25 will also move to the left by action of the spring 24, until the shoulder on the rod 25 touches the member 29. The movement of the valve 22 and the rod 25, just described, is usually about one-thirty-second of an inch before it is stopped by the threaded member 29. As soon as the rod 25 is stopped by the member 29, the member 7 will continue to move to the left so that the valve seat 8 will no longer contact with the valve 26 and fuel will be by-passed through the hole 9 and into the pipe 16. The adjustment of the nut 13 will regulate whatever pressure will be maintained in the chamber 2. The groove 27 in the valve 26 permits a very small flow of fuel from the chamber 2. When the valve 22 has moved away from its seat, fuel will flow through the nozzle 20 in a well known manner. When the oil burner is shut off, the pressure of the pump, not shown, which pump is usually operated by an electric motor, will gradually diminish until the spring 11 will overcome the pressure in the chamber 2 and the member 7 will move to the right, causing the valve seat 8 to contact with the valve 26 and move the rod 25, thereby causing the valve 22 to contact with the seat 21. The spring 11 is much larger and more powerful than the spring 24, so that, under the above mentioned conditions, the spring 11 will overcome the pressure of the spring 24. I have found that it is highly desirable to cut the small groove 27 in the by-pass valve so that the valve 22 will close promptly and not permit any after-dribble of oil out of the nozzle 20. If I did not provide the groove 27 in the by-pass valve, then, as the member 7 moves to the right and contacts with valve 26 so as to move the rod 25 and valve 22 to the right, the fuel pressure in the chamber 2 will instantly rise and cause the member 7 to again move to the left, and this fluttering action will continue until the pump finally stops and will cause an after-squirt of oil from the nozzle 20; however, by providing the groove 27, I find that this after-squirt is eliminated.

I claim:

1. In a valve, the combination with a casing having a liquid inlet, of a yielding member located within the casing, a spring cooperating with the yielding member and opposing the pressure of the liquid admitted to said casing, an elongated tube extending from the casing, said tube having an outlet at its outer end, a valve body provided with ribs on its outer wall and located axially of the elongated tube and having an attenuated end cooperating with the outlet in said tube, a spring cooperatively related to and carried by said valve body normally tending to move the valve body to open the outlet, a bearing member in said tube constituting a support for said valve body and cooperating with the ribs on its outer wall to hold said valve body in alignment with said outlet, an elongated stem within the tube separate from the valve body and bearing against the inner end of the valve body at one end and against the yielding member at its opposite end, and bearings within said tube located near each end of said stem for independently supporting the stem for longitudinal movement.

2. In a valve, the combination with a fluid pressure chamber, of a yielding member within said chamber, a spring cooperatively related with said yielding member and in opposition to the pressure in said fluid pressure chamber, means for adjusting the tension of said spring, an elongated tube communicating with said fluid pressure chamber at one end and having a discharge outlet at the opposite end, spaced supports in said tube, a stem having a reduced diameter with respect to said tube, said stem being supported for longitudinal movement in said supports and the inner end of said stem being operatively related to said yielding member, a needle valve having an elongated body for opening and closing the outlet from said tube and said valve being in longitudinal alinement with said stem, a spring cooperating with said needle valve normally tending to move said needle valve to open said outlet, and a support for the needle valve adjacent to the outlet for holding the needle valve in alinement with said outlet.

3. In an automatic valve, the combination with a casing having a liquid inlet, of a yielding member located within the casing, a spring cooperating with the yielding member and opposing the pressure of the liquid admitted to said casing, an elongated tube extending from said casing, said tube having an outlet orifice at its outer end providing a valve seat, a valve body located axially of the elongated tube, the end of said valve body cooperating with said valve seat to open and close said outlet orifice, a support for the valve body arranged to permit passage of liquid therethrough and to constitute a guide for the valve body to hold it in alignment with the outlet orifice, a spring carried by said valve body normally tending to move the valve body to open the outlet orifice, and an elongated stem within the tube separate from the valve body and contacting with the inner end of said valve body at one end and against the yielding member at its opposite end.

LEWIS L. SCOTT.